(12) United States Patent
Kobayashi et al.

(10) Patent No.: US 7,844,711 B2
(45) Date of Patent: Nov. 30, 2010

(54) VOLUME ALLOCATION METHOD

(75) Inventors: Ikuko Kobayashi, Kawasaki (JP);
Shinji Kimura, Sagamihara (JP);
Daisuke Yokota, Kawasaki (JP);
Akihisa Nagami, Yokohama (JP);
Mitsuru Ikezawa, Sagamihara (JP);
Yukinobu Mizoguchi, Odawara (JP);
Hiroji Shibuya, Odawara (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 11/968,711

(22) Filed: Jan. 3, 2008

(65) Prior Publication Data

US 2008/0209041 A1    Aug. 28, 2008

(30) Foreign Application Priority Data

Feb. 26, 2007    (JP) .............................. 2007-044858

(51) Int. Cl.
*G06F 15/173* (2006.01)
(52) U.S. Cl. ........................ 709/226; 709/223; 709/224
(58) Field of Classification Search ................. 709/229, 709/223–224, 226; 711/171; 370/229
See application file for complete search history.

(56) References Cited

U.S. PATENT DOCUMENTS

2003/0177239 A1* 9/2003 Shinohara et al. ........... 709/226
2005/0044336 A1   2/2005 Shimada et al.
2005/0193128 A1* 9/2005 Dawson et al. .............. 709/229
2006/0098572 A1* 5/2006 Zhang et al. ................ 370/229
2006/0168394 A1   7/2006 Nakatsuka et al.
2006/0224853 A1* 10/2006 Shimazaki et al. .......... 711/171
2007/0094395 A1* 4/2007 Mizuno et al. .............. 709/226

FOREIGN PATENT DOCUMENTS

JP    2001-350707    12/2001
JP    2006-209294    8/2006

* cited by examiner

*Primary Examiner*—Thu Nguyen
*Assistant Examiner*—Brian P Whipple
(74) *Attorney, Agent, or Firm*—Brundidge & Stanger, P.C.

(57) ABSTRACT

A management device selects a storage device having a plenty of unallocated storage regions, selects a target using a port having a small allocation quantity from the storage device targets, and allocates the target, an initiator, and a storage region. When the number of targets and the allocated storage regions prepared by the storage device is within a predetermined number, the storage device manages the storage device as an allocation candidate. When the predetermined number is exceeded, the exceeding one is excluded from the allocation candidate. When the number of storage devices excluded from the allocation candidate has reached a certain number, the management device manages a new storage device and a new storage region as an allocation candidate.

20 Claims, 11 Drawing Sheets

FIG. 6

| CONTROLLER NUMBER | PORT NUMBER | TARGET NUMBER | TARGET NAME | INITIATOR NAME | CHAP | PASSWORD | LU NUMBER |
|---|---|---|---|---|---|---|---|
| 0 | A | 0 | Target1 | Initiator1 | userA | abcd | 399 |
| 0 | A | 1 | Target2 | | | | |
| .. | .. | .. | .. | | | | |
| 1 | A | 0 | Target500 | Initiator1 | userA | abcd | 399 |
| .. | .. | .. | .. | | | | |

| | 221 |
|---|---|
| DEVICE ID | 1001 |
| MANAGEMENT INTERFACE INFORMATION | CTRL0=192.168.1.1 |
| | CTRL1=192.168.1.2 |
| MANAGEMENT STATE: ALLOCATABLE/OUT OF OBJECT/WAITING | ALLOCATABLE |

| | 222 |
|---|---|
| TARGET ID | 2001 |
| DEVICE ID | 1001 |
| ISCSI INITIATOR NAME | Initiator1 |
| MAIN ISCSI TARGET NAME | Target1 |
| MAIN ISCSI TARGET IP ADDRESS | 192.168.1.10 |
| MAIN TARGET NUMBER | 0 |
| MAIN TARGET CONTROLLER PORT | CTRL0、A |
| SUB ISCSI TARGET IP ADDRESS | Target500 |
| SUB ISCSI TARGET IP ADDRESS | 192.168.1.12 |
| SUB TARGET NUMBER | 0 |
| SUB TARGET CONTROLLER PORT | CTRL1、A |
| ALLOCATION STATE: ALLOCATED/UNALLOCATED | UNALLOCATED |

| | 223 |
|---|---|
| RAID-GID | 3001 |
| IN-CHARGE | 1001 |
| IN-CHARGE CONTROLLER | 0 |
| RAID-G NAME | 0 |
| BASIC LU SIZE(GB) | 10 |
| MANAGEMENT STATE: ALLOCATABLE/WAITING | ALLOCATABLE |

| | 224 |
|---|---|
| RAID-GID | 3001 |
| LU NUMBER | 399 |
| ALLOCATION STATE: ALLOCATED/UNALLOCATED | UNALLOCATED |

FIG. 9

ALLOCATION MANAGEMENT INFORMATION  225

| USER ID | user001 |
|---|---|
| AUTHENTICATION INFORMATION (CHAPID) | user001 |
| PASSWORD | abcd |
| ALLOCATION TARGET | 2001 |
| PARENT LU NUMBER | 399 |
| VOLUME SIZE (GB) | 20 |

FIG. 10

```
#COMMAND, USER ID, TOTAL CAPACITY, BASIC LU SIZE, CHAP, PASSWORD
alloc、user1、20、10、user1、abcd
exp、user2、30
dealloc、user3
```

FIG. 12

| DEVICE ID | CONTROLLER | TOTAL NUMBER OF TARGETS | ALLO-CATION QUANTITY | THRESHOLD VALUE |
|---|---|---|---|---|
| 1001 | 0 | 250 | 10 | 50 |
| 1001 | 1 | 250 | 10 | 50 |
| 1002 | 0 | 250 | 8 | 50 |
| 1002 | 1 | 250 | 10 | 50 |
| 1003 | 0 | 250 | 8 | 50 |
| 1003 | 1 | 250 | 8 | 50 |

| DEVICE ID | LU SIZE | RAID-GID | TOTAL NUMBER OF LUS | ALLO-CATION QUANTITY | THRESHOLD VALUE |
|---|---|---|---|---|---|
| 1001 | 10 | 3001 | 300 | 10 | 10 |
| 1001 | 10 | 3002 | 300 | 12 | 10 |
| 1002 | 5 | 3003 | 600 | 10 | 10 |
| 1003 | 20 | 3004 | 150 | 10 | 10 |
| 1003 | 20 | 3005 | 150 | 20 | 10 |

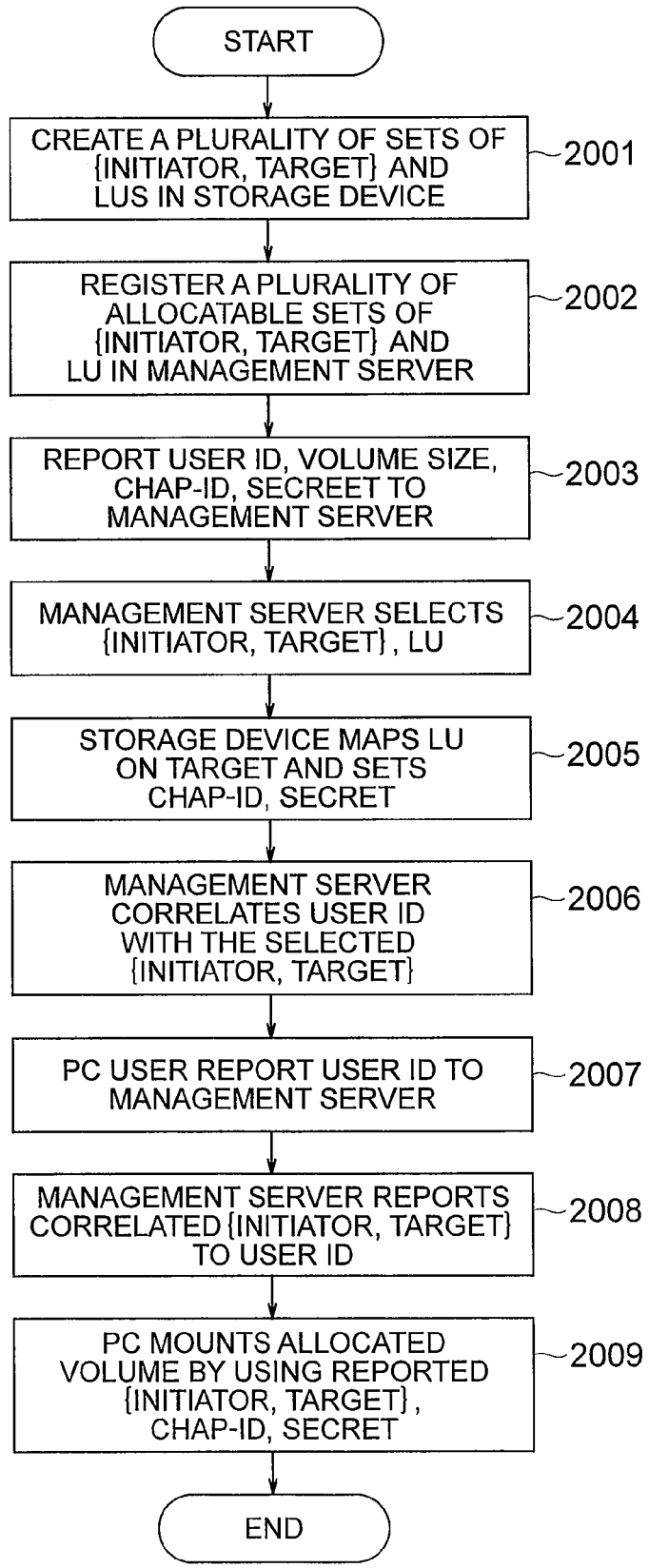

VOLUME ALLOCATION METHOD

INCORPORATION BY REFERENCE

The present application claims priority from Japanese application JP 2007-044858 filed on Feb. 26, 2007, the content of which is hereby incorporated by reference into this application.

FIELD OF THE INVENTION

The present invention relates to a volume allocation system including a plurality of personal computers (PC) and a plurality of storage devices which care connected by a network, wherein a storage region corresponding a PC local disk is allocated from a storage device.

BACKGROUND OF THE INVENTION

Conventionally, an operating system (OS) and various application programs are stored in a storage device such as a hard disk drive (HDD) of respective computers so as to be executed in them. In contrast to this, recently a storage centric system is disclosed. That is, OS and various application programs stored in storage devices of separate computers are collected in a network type storage device (hereinafter, referred to as a storage device) and backup and virus scan are executed all at once. Each PC of this system uses a logically divided storage region (LU: Logical Unit) of the storage device instead of a local HDD.

A volume (a storage region recognized by the OS of the PC) allocated for a PC is uniquely determined by a combination of a target defined in a port of the storage device and an LU created on a disk of the storage device. In the port of the storage device, a plurality of targets are defined. The PC is connected to the allocated target and can use the LU mapped on the target as the local disk of the PC.

A method for allocating an LU of a storage device connected by a network for a computer is disclosed, for example, in JP-A-2001-350707, in which a virtual LU is defined on the PC. When an access to the virtual LU occurs, a storage allocation program on the PC collects evaluation data from the storage device, decides a usable LU, and registers it on the PC. Thus, the PC side can allocate the storage device or the LU.

It should be noted that as the storage device or the LU evaluation data, an IO delay time, an IO frequency, a backup frequency, presence/absence of volume dual write function, an empty volume (region where no LU is created) are disclosed.

Moreover, a method for allocating an LU of the storage device connected by a network for a computer is disclosed, for example, JP-A-2006-209294, in which a target to be allocated can be selected so as to make the port load equal.

SUMMARY OF THE INVENTIONS

The number of PCs is by far greater than the number of servers. Since the number of storage devices connected per port is increased as compared to the conventional system, there is a first problem that volumes should equally allocated for a storage device port so that access is not concentrated in a particular port of the storage device.

Moreover, the size of the volume required by the PC user differs depending on the job contents. There is a second problem that it is preferable to allocate a volume of appropriate size for each user such as 10 G and 20 G.

For these problems, in the conventional method of JP-A-2001-350707, a storage device which can be used by the computer is defined in advance in the computer side and the computer decides an allocatable volume from the defined storage devices. That is, in this method, a system administrator registers in advance from which storage group a volume is to be used by each computer. Accordingly, the number of computers connected to a controller of the storage device will not exceed the set number. However, no consideration is taken for the number of storage devices connected per port. The network having a port to which many computers are connected is used excessively and the controller load is increased. Accordingly, it is impossible to solve the aforementioned first problem, i.e., lowering of the disk access performance.

In the conventional method disclosed in JP-A-2006-209294, no consideration is taken on the volume size and if the size of the volume to be allocated for each user differs, the connection load per storage device cannot be equal. For example, 500 PCs can be connected to a storage device having two controllers capable of connecting 125 PCs per port. Assume that the volume of a disk mounted on the storage device is 5 T bytes by estimating 10 G bytes per PC. When there are two such devices, since the conventional method makes the number connected per port is made equal, the target allocation is performed in the order of the device A, the device B, the device A, the device B .... When all the users allocated to the device A use a 20 G-byte volume, the total number of disk becomes insufficient earlier than the number of targets and allocation cannot be performed to the device A. As a result, 250 PCs are connected to the device A and 500 PCs are connected to the device B. Thus, the load on the device is unequal. That is, the aforementioned second problem cannot be solved.

In order to solve at least one of the first and the second problem, the present invention provides a system capable of allocating a target and an LU so that access is not concentrated to a particular storage device or a particular port in the management device side.

Provided is a method for allocating a volume for a computer in a system including a plurality of computers, a plurality of storage devices, and a management device connected by a network. The storage devices prepare a plurality of targets and a plurality of storage regions. The management device manages a combination of a plurality of targets set in the storage devices and an initiator for making a connection with a target and an allocation state of a plurality of storage regions set in the storage devices. When a computer reports the size of the volume required and user information to the management device, the management device selects a target and a storage region. The storage device maps the initiator, the storage region, and the authentication information on the target and the management device reports the allocated target and the initiator to the computer.

The management device selects a storage device having a plenty of unallocated storage regions and selects a target using a port having a small number of allocations within the targets of the storage device, thereby allocating the target, the initiator, and the storage region.

When the number of targets prepared by the storage device and the number of allocated storage regions are within a predetermined number, the management device manages the storage device as an allocation candidate. When the numbers exceed the predetermined number, the management device exclude the storage device. When the number of storage devices excluded from the allocation candidate has reached a certain number, a new storage device and a new storage region are managed as an allocation candidate.

Since the number of storage devices can be increased in accordance with the number of PCs and the number of users, it is possible to effectively use the storage regions of the storage device.

BRIEF DESCRIPTION OF THE DRAWINGS

FIG. 6 explains a target table stored in a storage unit of the storage device.

FIG. 7 explains a volume management table (resource management information) stored in the storage unit of the management device FIG. 8 explains the relationship between the respective items of resource management information.

FIG. 9 explains a volume management table (allocation management information) stored in the storage unit of the management device.

FIG. 10 explains a parameter example of allocation, extension, and release instruction.

FIG. 12 explains target and LU remaining amount management information.

FIG. 13 is a flowchart showing an allocation routine including a management device, a storage device, and a PC.

DESCRIPTION OF THE INVENTION

Description will now be directed to a volume allocation method according to the present invention.

—System Configuration—

Referring to FIG. 1 to FIG. 4, explanation will be given on the brief configuration of a computer system according to a present embodiment.

Figure 1:
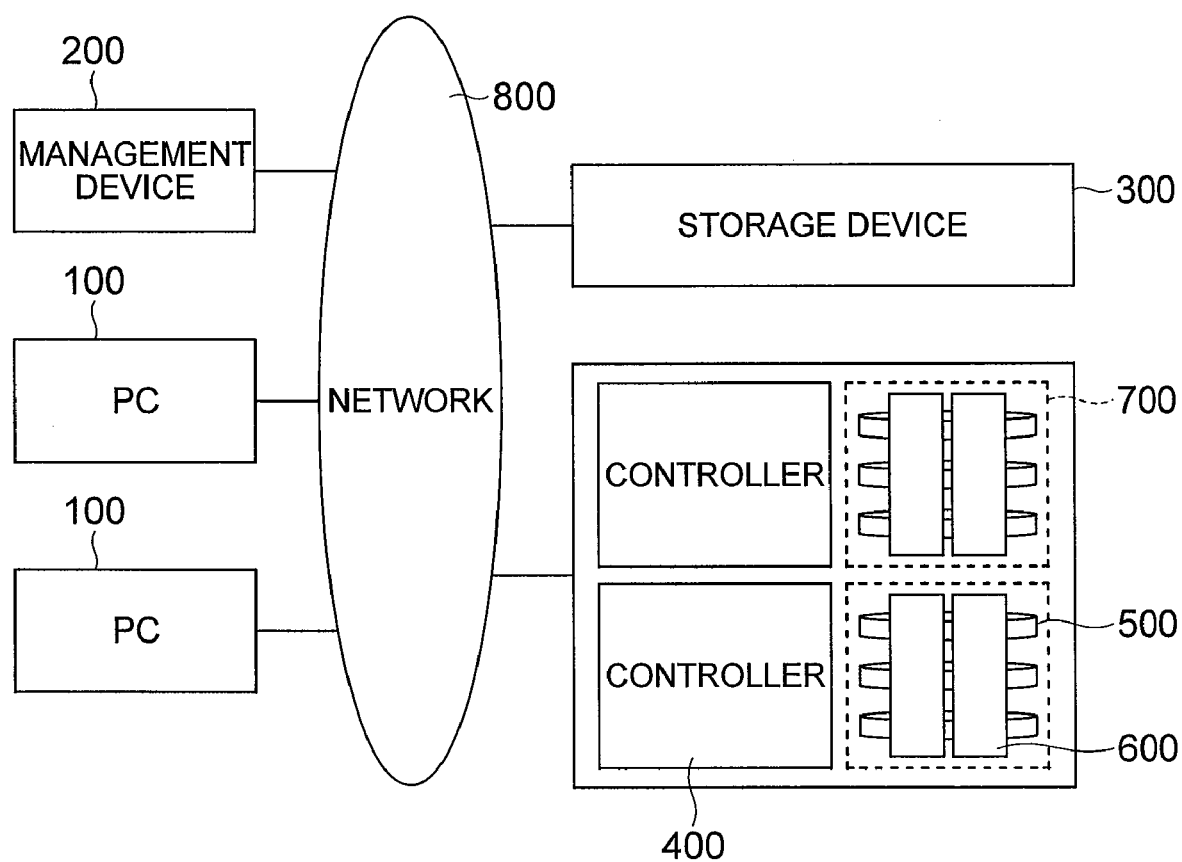
FIG. 1 explains a brief configuration of a computer system according to a present embodiment.
Figure 2:
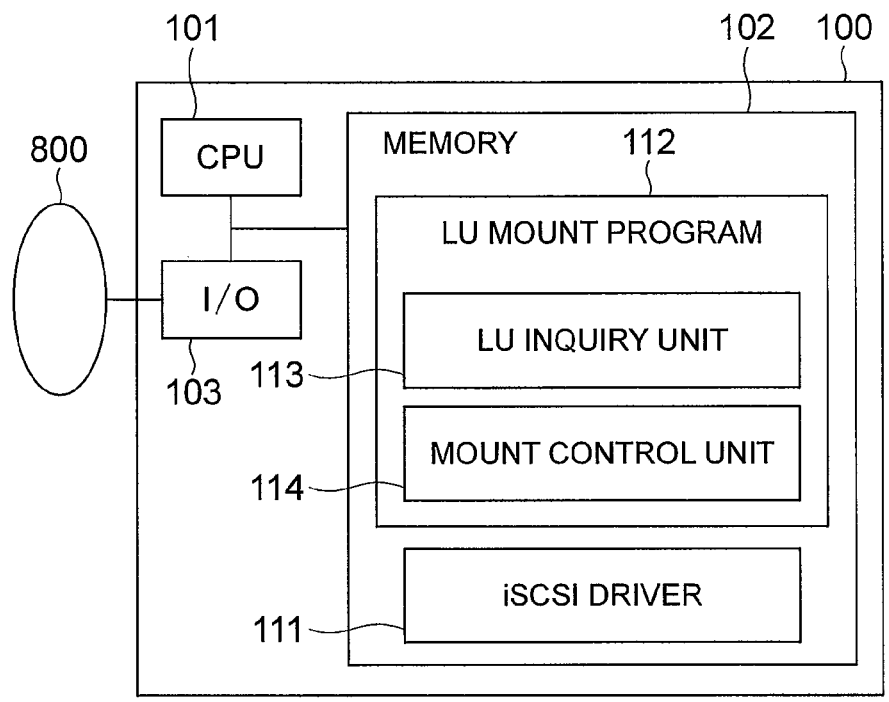
FIG. 2 conceptually explains an internal configuration of a PC according to the present embodiment.
Figure 3:
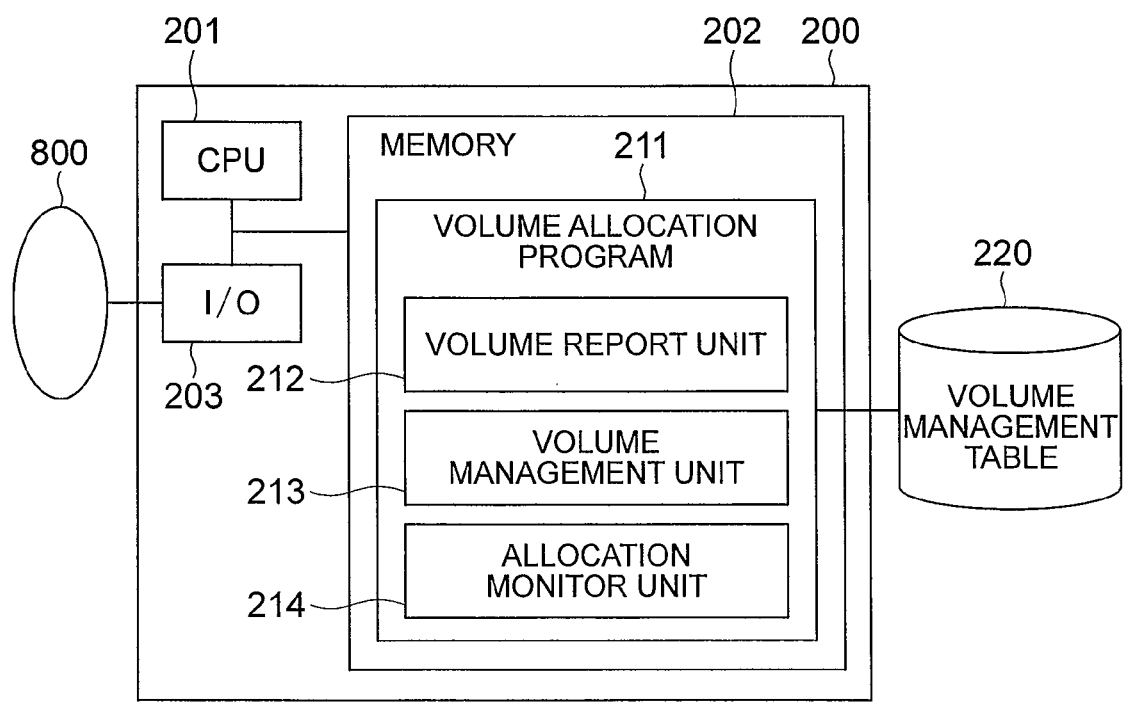
FIG. 3 conceptually explains an internal configuration of a management device according to the present embodiment.
Figure 4:
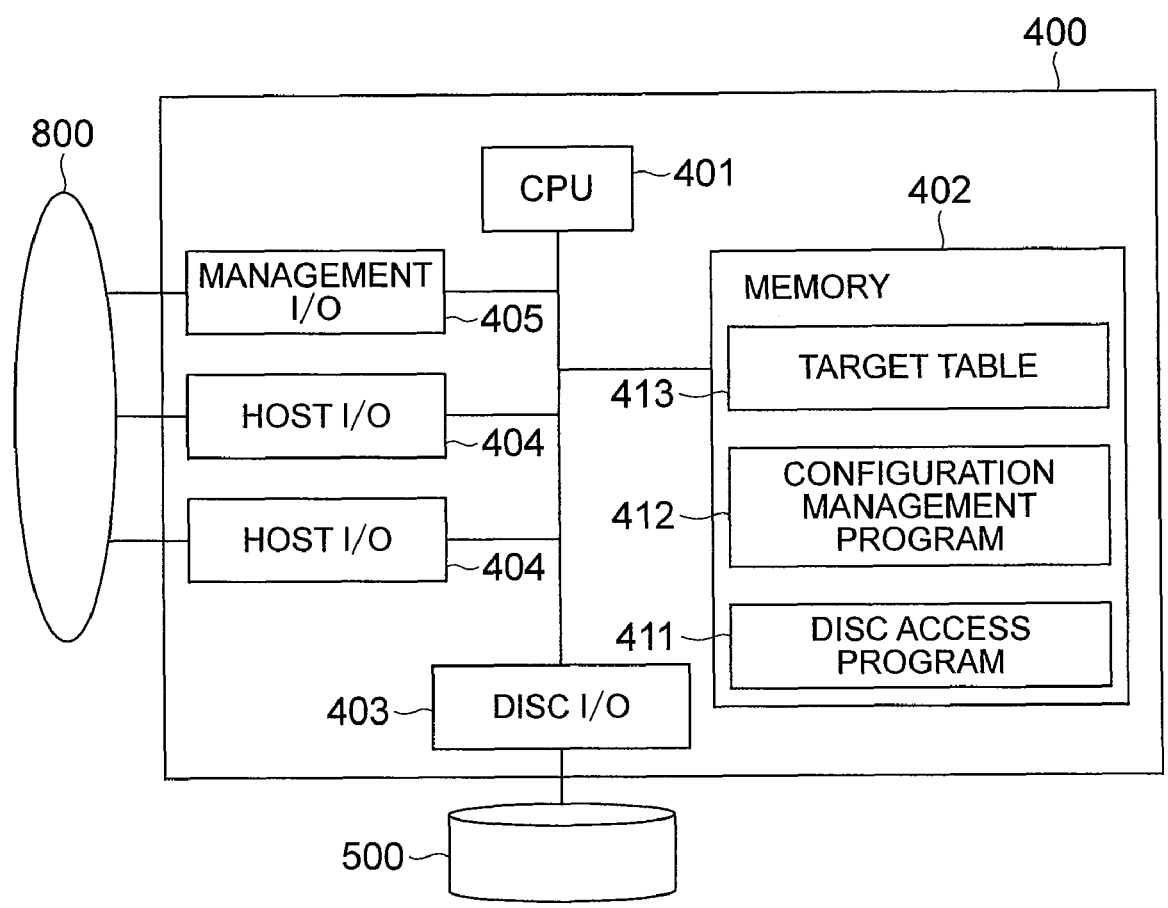
FIG. 4 conceptually explains an internal configuration of a storage device according to the present embodiment.

FIG. 1 explains a brief configuration of a computer system according to the present embodiment. FIG. 2 conceptually explains an internal configuration of a PC according to the present embodiment. FIG. 3 conceptually explains an internal configuration of a management device according to the present embodiment. FIG. 4 conceptually explains an internal configuration of a storage device according to the present embodiment.

As shown in FIG. 1, the computer system according to the present embodiment includes: a PC 100 used by a user, a management device 200 performing volume allocation and a storage device having an LU used by the PC. The PC 100, the management device 200, and the storage device 300 are connected via an IP network 800. The IP network 800 is a local area network (LAN) formed by the Ethernet (registered trade mark) and uses a TCP/UDP/IP protocol as a communication protocol for executing data transmission. In this embodiment, the iSCSI protocol is used for communication between the PC 100 and the storage device 300.

The storage device 300 is formed by a controller 400 and a plurality of magnetic hard disk drives (HDD) 500. The storage device 300 is a disk array device which is RAID-configured by a plurality of HDD 500. The disk array group which is RAID-configured will be called a RAID group (RAID-G) 700. The RAID-G provides a plurality of logical storage regions. The logical storage region is a logical unit (LU) 600.

As shown in FIG. 4, the controller 400 of the storage device 300 includes inside: a CPU 401, a memory 402, a disk I/O 403, a host I/O 404, and a management I/O 405. The CPU 401, the memory 402, and the I/O 403, 404, 405 are mutually connected via a bus. The CPU 401 is a calculation processing device executing various programs stored in the memory 402. The memory 402 is a so-called internal storage unit including a non-volatile memory for storing various programs and a volatile memory for temporarily storing a calculation processing result. The disk I/O 403 is connected to the HDD 500. The host I/O 404 is connected to the PC 100 via the IP network 700. The management I/O 405 is connected to the management device 200 via the IP network 800. The memory 402 contains a disk access program 411, a configuration management program 412, a target table 413.

The disk access program 411 receives an LU read and write instruction from the host I/O 404 and executes these instructions by using the disk I/O 403. The configuration management program 412 receives instructions such as creation of an LU 600 on the HDD 500, creation of a target as information used by the PC 100 to identify the LU 600, and mapping of LU on the target from the management I/O 405 and executes the instructions. The target table is a table for managing a combination of a target number and an iSCSI target name defined in the host I/O 404 of the controller. More details on the target table will be given later. The target created by the configuration management program 412 and the mapping relationship between the target and the LU is set in the target table.

As shown in FIG. 3, the management device 200 includes inside: a CPU 201, a memory 202, and an I/O interface 203. The CPU 201, the memory 202, and the I/O interface 203 are mutually connected via a bus. The CPU 201 is a calculation processing device for executing various programs stored in the memory 202. The memory 202 is a so-called internal storage device including both of a non-volatile memory for storing various programs and a volatile memory for temporarily storing calculation processing results. The I/O interface 203 is connected to the PC 100 and the storage device 300 via the IP network 700.

The memory 202 contains a volume allocation program 211. The volume allocation program 211 is a program executing the volume allocation process according to the present method. A volume report unit 212 reports information on the allocated volume to a PC. A volume management unit 213 sends an instruction to a configuration management program 4112 of the storage device 300, maps an LU to a target, and allocates a volume. An allocation monitoring unit 214 monitors the volume allocation state and suppresses a new allocation process and performs a report to an administrator. The volume management table 220, which will be detailed later, is formed by the target which can be used in the system, LU resource management information, and allocation management information. It is possible to manage a target and an LU allocated to the user and a target and an LU which are not yet allocated.

As shown in FIG. 2, the PC 100 includes insides: a CPU 101, a memory 102, and an I/O interface 102. The CPU 101, the memory 102, and the I/O interface are mutually connected via a bus. The CPU 101 is a calculation processing device for executing various programs stored in the memory 102. The memory 102 is a so-called internal storage device including both of a non-volatile memory for storing various programs and a volatile memory for temporarily storing calculation processing results. The I/O interface 103 is connected to the storage device 300 and the management device 200 via the IP network 700.

The memory 103 contains a volume mount program 112 and an iSCSI driver 111. The volume mount program 112 is a program concerning the present method and performs a process for causing the OS of the PC 100 to recognize the volume information allocated to the user. A volume inquiry unit 113 acquires allocated volume information from a volume report unit 212 of the management device 200. A mount control unit 114 uses the acquired volume information for mounting the volume. The iSCSI driver 111 is a program executing the iSCSI protocol and is connected to the target of the storage device 100 for reading/writing the LU data block.

—Configuration of Storage Device—

Figure 5:
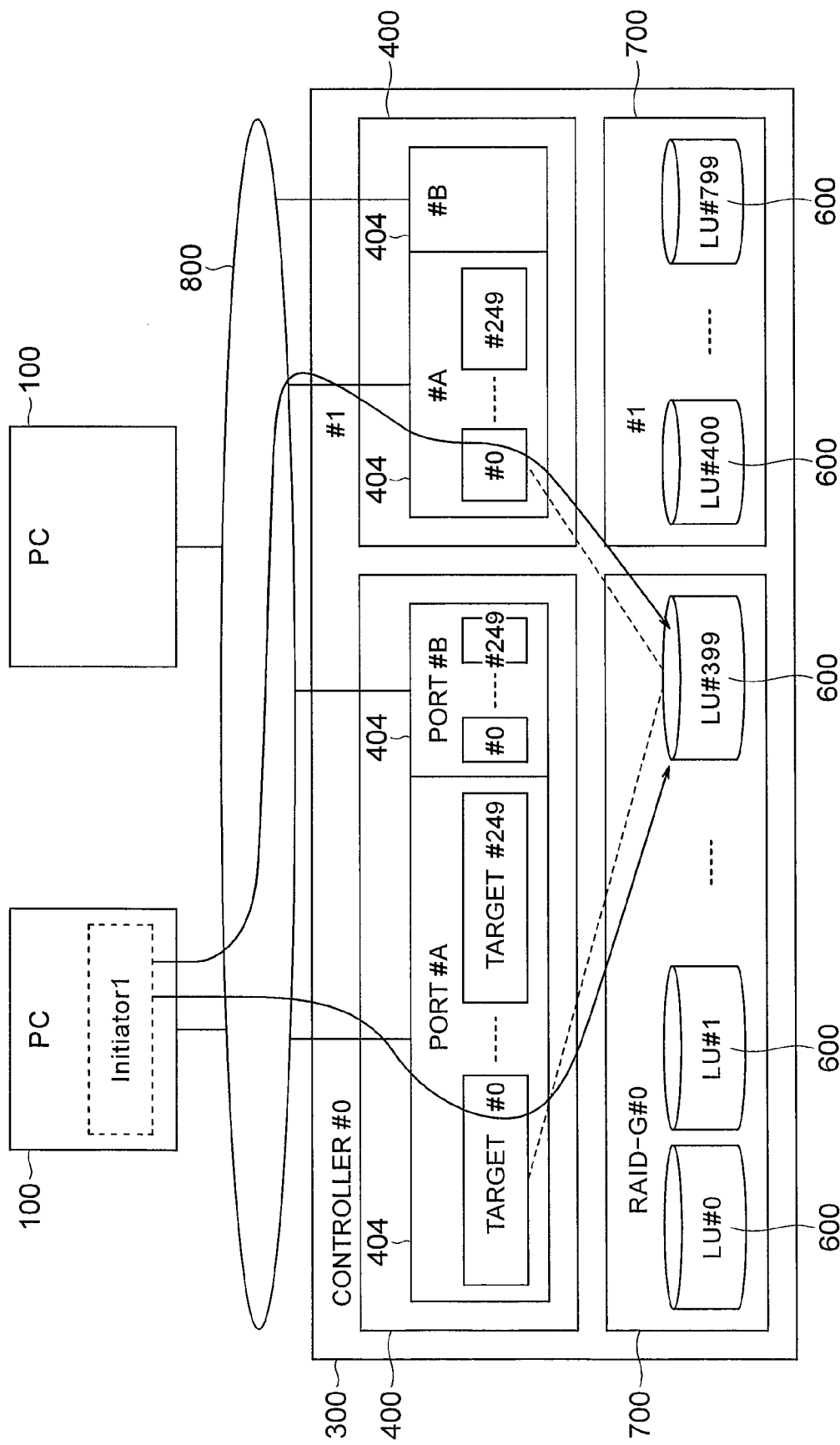
FIG. 5 conceptually explains an LU configuration of the storage device in the present embodiment.

Referring to FIG. 5, explanation will be given on the configuration of the storage device according to the present embodiment. The storage device 300 includes at least one controller 400 and at least one host I/O 400. Here, the configuration will be detailed by using a middle-size storage device having two controllers 400: a controller #0 and a controller #1, and two host I/O 404 (port #A, port #B) per controller.

On IP address is defined in a management IO port 405 and a host I/O port of the storage device 300. A plurality of targets are defined in the port and an iSCSI target name uniquely identifying the port and the target is set. The number of targets represents the number of hosts which can be connected to the storage device 300. The maximum number is decided according to the processing ability of the storage device 300. In the case of the storage device 300 in which 256 hosts can be connected per port, 1000 targets are defined per device.

A RAID-G 700 is created on the disk 500 mounted on the storage device 300 and a plurality of LUs 600 are created in the RAID-G 700. At least one RAID-G 700 is created. All the LUs in the RAID-G 700 are created with the identical size. For example, in the storage device on which 6 T-byte disk 500 is mounted, two RAID-G 700 are created and 300 10 G-byte LUs can be created in each RAID-G 700. In the storage device 300 on which a 3 T-byte disk 500 is mounted, one RAID-G 700 is created and 600 5 G-byte LU can be created in the RAID-G 700. The 10 G-byte LU can be increased into 10 G unit and 5 G-byte LU can be increased into 5 G unit.

In this system, connection control to the LU 600 can be performed by an initiator name.

For this, an initiator name is set in the target and the LU is mapped in the target. At the stage when the target is created, in the target table 411 shown in FIG. 6, a target name is set to a predetermined controller number, a port number, and a target number. When a value is set in the term of the initiator name of the target table 411, connection to the target is allowed only from the PC using the initiator name. If no initiator name is set, no connection is allowed by using any initiator name. When the CHAP-ID and the password are set in the target table 411, no connection is made unless authentication is successful. If no CHAP-ID and no password are set, no connection is allowed by using any initiator name. When the LU number is set in the term of the LU number of the target table 411, read/write to the LU 600 are enabled. If no value is set, the LU 600 cannot be viewed by the PC 100 even if the connection to the target is allowed. That is, by setting the initiator name, the CHAP-ID, and the password, one of the targets of the storage device 300 is allocated to the user and by setting the LU number, one of the LU of the storage device 300 is allocated to the user.

—Volume Allocation Function—

In this system, targets and LU are allocated. As for the volume size, the minimum size is decided but the volume size can be selected by each user. Moreover, provided is a function that a user can use a volume from an arbitrary PC.

This system provides five function: allocation, extension, allocation release, remaining amount management, and allocation report.

The allocation function creates a volume of a size specified by the user. The extension function extends the allocated volume into a specified size. The allocation release releases the allocated volume so that it can be used as a volume of another user. The remaining management manages the remaining amounts of the target and the LU so that allocation will not be concentrated on a particular storage device 300. The allocation report reports information on the target allocated in the PC 100 so that PC 100 can use the volume.

—Outline of the Service Start Preparation—

An administrator prepares the service start according to the following procedure.

Firstly, the storage device 300 is initialized. An IP address is set for the I/O port and the host I/O port of the storage device 300, a target is created, and a target name is defined. An RAID-G 700 is created, the LU size is decided, and an LU 600 is created in the RAID-G 700.

Next, resource management information (storage device information 221, target information 222, RAID-G information 2223, and LU information 224) in the volume management table 220 is created. The resource management information relates to a target and an LU which can be used in the system. FIG. 7 shows respective items of the resource management information.

The storage device information 221 has items of the device ID, the management interface information, and the management state. The device ID sets information uniquely identifying a device in the system. The management interface information sets an ID identifying a controller and an IP address set in the controller management I/O port. The management state is information indicating whether the target and the LU of the storage device 300 are used for allocation. "Allocatable" means that the target and the LU can be used for allocation and "out of object" means that extension and allocation release can be performed but not used for allocation, and "waiting" means that the target and the LU have been created but not to be used in operation. Upon service start, the storage devices 300 in the "allocatable" state and "waiting" state are prepared.

The target information 222 is information defining the combination of the main and the sub target which can be created in the storage device 300 and can be allocated. The target information 222 contains the following items: a target ID, a device ID, an iSCSI initiator, main and sub iSCSI target name, an iSCSI target IP address, a target number, and a target controller port. Here, the reason why two targets, i.e., the main and the sub target exist is that two routes for connection to the LU are available. When two connection routes are present, even if the controller of the main target or the route to the host I/O port has failed, the sub target can be used for making a connection to the LU. This state will be explained by using FIG. 5 and FIG. 6. For example, LU 600 of the LU number 399 is mapped to Target 1 of [controller 0, port A, target number 0] and Target 500 of [controller 1, port A, target number 0]. The PC 100 can use Initiator 1 for making connection to LU #399 from the main target having the target name Target 1 and the sub target having the target name Target 500.

When 1000 targets are defined in the storage device 300, 500 target information 222 are created. Information for uniquely identifying a combination of the main and the sub target is set in the system. The device ID sets the device ID of the storage device 300 where the target exists. The iSCSI initiator name is used when the PC 100 is connected to the target. The initiator name is set so as to be unique in the system. The target controller port sets information for identifying the controller and the I/O post. The iSCSI target name sets a target name set in the target number. The iSCSI target IP address sets the IP address set in the host I/O port. The main target and the sub target are allocated in different controllers. When the main target is in {controller 0, port A}, the sub target is allocated from [controller 1, port A] and when the main controller is in [controller 1, port B], the sub target is allocated from [controller 0, port B]. The allocation state is information indicating whether the target is allocated for the user. "Allocated" means the state that in use by user and "unallocated" means the state not in use by user. Upon service start, "unallocated" is set.

The RAID-G information 223 has the following items: RAID-GID, in-charge device ID, in-charge controller, RAID-G number, basic LU size, in-charge enabled device ID, and management state. The RAID-GID sets information uniquely identifying a RAID-G created in the storage device 300 in the system. The in-charge device ID is information for specifying a storage device 300 to perform LU I/O and sets a device ID. The in-charge controller is information for specifying a controller to perform LU I/O and sets a controller number. When a controller number is set, the main target belonging to the specified controller is selected and the LU is mapped. When no controller number is set, a main target is selected without limiting a controller and mapping is performed with the LU. The RAID-G name sets an identifier used in the storage device 300. The basic LU size sets size of the LU created in the RAID-G. The management state is information indicating the management state whether RAID-G, i.e., LU in the RAID-G is to be used for allocation. "Allocatable" indicates a state that the LU can be used for allocation and "waiting" indicates that LU has been created but not to be used for operation. Upon service start, RAID-G of the "allocatable" state and the "waiting" state are prepared.

The LU information 224 has terms of RAID-GID. LU number, and allocation state. RAID-GID sets the RAID-GID of the RAID-G where LU is created. The LU number sets a number for identifying the LU in the storage device 300. The allocation state is information indicating whether the LU is allocated for a user or not. "Allocated" indicates a state of being used by a user and "unallocated" indicates a state not used by a user. Upon service start, "unallocated" is set.

Figure 8:
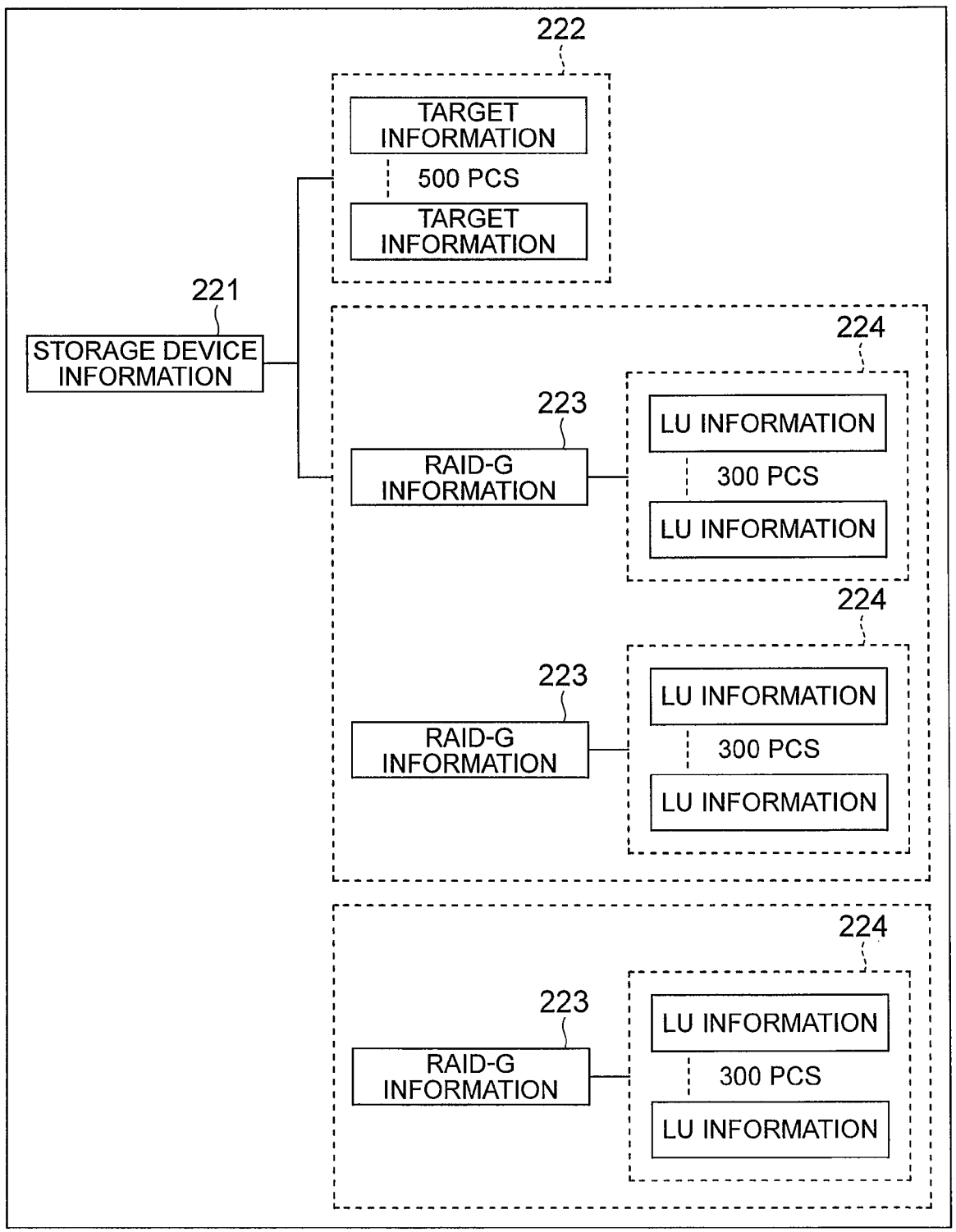

FIG. 8 shows the relationship between the storage device information 221, the target information 222, the RAID-G information 223, and the LU information 224. In one storage device 300, one storage device information 221, L target information 222, M RAID-G information 223, and N LU information 224 are formed. The storage device 300 shown in FIG. 8 provides 500 targets and 900 LUs, among which 300 LUs are in "the waiting state".

Next, the administrator starts the volume allocation program 211 and starts a service.

—Volume Allocation Process—

The volume allocation process is executed by a volume management unit 213 of the volume management program 211. The allocation state is managed by the allocation management information 225. FIG. 9 shows configuration of the allocation management information 225. The allocation management information 225 has the following items: a user ID, authentication information, a password, an allocation target, a parent LU number, and a volume size. In the allocation target, the target ID of the target allocated by the user is set. In the parent LU number, the number of the first LU of the LUs constituting the volume is set. In the volume size, the total amount of LUs allocated is set.

Figure 11:
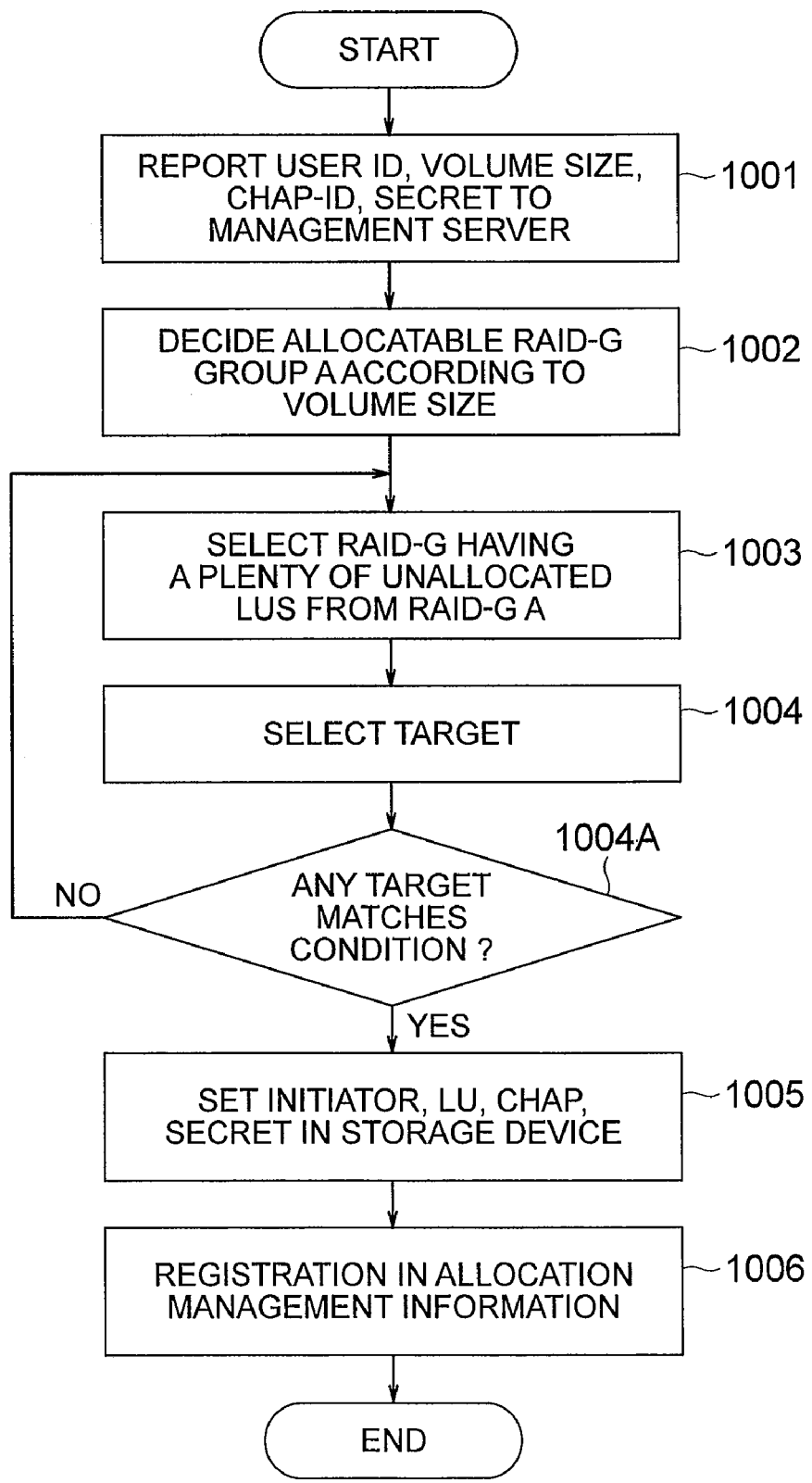
FIG. 11 is a flowchart showing an allocation routine of the management device.

Referring to FIG. 11, the volume allocation process will be detailed.

The administrator issues an allocation request to the volume management unit 213 (1001). For example, a text file as shown in FIG. 10 is read in by the volume management unit 213. The text file has the following items: allocation/extension/allocation release command type, ID of user to be allocated, size of volume to be created, basic LU size for which volume is to be created, CHAP-ID used by the user, and a secret. If no basic LU size is set, the volume management unit 213 decides the size of LU which can create a specified volume.

The volume management unit 213 searches for the RAID-G information 223 in which the management state of the storage device information is "allocation object" and the management state of the RAID-G information 223 is "allocation object". Referring to the basic LU size of the RAID-G information 223, a RAID-G group A capable of creating the specified volume size is decided (1002).

The volume management unit 213 selects RAID-G information 223 having a plenty of LU in "unallocated" state (1003) among the usable RAID-G information 223. Referring to the in-charge device ID of the RAID-G information 223, "unallocated" target information 222 is searched among target information 222 belonging to the device ID. If no unallocated target information 222 exists, RAID-G information 223 as the next candidate is selected from the RAID-G group A obtained in step 1002 to search for unallocated target information 222. From the searched target information 222, one target information 222 is selected. If an in-charge controller is set for the RAID-G information 223, by obtaining the number of target information 222 which have been allocated to a user per port according to the target information 222 having a positive target defined in the specified controller, the target information 222 defined in a port having the least allocations is selected and the number of allocations per port is made equal. If no specification is made, in order to make the port allocation quantity equal, the number of target information 222 which have been allocated to the user is obtained and the target information 222 defined in the port having the least allocations is selected and the allocation state is modified to "allocated" (1004). From the LU information 224 belonging to the selected RAID-G information 223, a plurality of unallocated LUs are selected and the allocation state is modified to "allocated". For example, if the basic size of the LU is 10 G bytes, two LUs are selected to create a 20 G-byte volume (1004).

When the selected target satisfies a predetermined condition (1004A), the volume management unit 213 makes a requests via a management I/O port of the storage device 300 to which the selected target belongs. That is, the volume management unit 213 request the configuration management program 412 to perform LU mapping to the main and the sub target, connect LUs, and set the initiator name, CHAP, and the password. The configuration management program 412 maps the LU to the main and the sub target, connects the specified LU, and set s the initiator name, CHAP, and the password in the target table (1005).

The volume management unit 213 sets the user ID allocated in the allocation management information 225, CHAP, the password, the target ID of the allocated target information 222, the parent number of the allocated LU, and the volume size.

—Volume Increase Process—

The volume increase process is executed by the volume management unit 213 of the volume allocation program 211.

The administrator issues an extension request to the volume management unit 213. For example, the volume management unit 213 is made to read a text file as shown in FIG. 10. The text file has the following items: allocation/extension/ allocation release command type, ID of the user for whom extension is performed, and size of volume to be created.

The volume management unit 213 references the allocation management information 225 and searches for the user ID, allocation target, the allocated target information 222 from the parent LU number, and RAID-G information 223. The number of LUs required for creating the specified volume is obtained and unused LUs are selected from the LU information 224 belonging to the RAID-G information 223, and their mode is modified to "allocated". If no unused LU exists, LU information 224 belonging to other RAID-G information 223 is searched. Similarly as upon allocation, RAID-G information 223 is selected according to the in-charge controller information on the RAID-G information 223.

The volume management unit 213 request the configuration management program 412 to perform LU connection via the management I/O port of the storage device 300 to which the target allocated to the user belongs.

The volume management unit 213 updates the user volume size which has been increased in the allocation management information 225.

—Volume Allocation Release Process—

The volume allocation release process is executed by the volume management unit 213 of the volume management program 211.

The administrator issues a release request to the volume management unit 213. For example, the volume management unit 213 is made to read the text file as shown in FIG. 10. The text file has the following items: allocation/extension/allocation release command type, and user ID to be released.

The volume management unit 213 references the allocation management information and searches for the allocated target information 222 according to the user ID, allocation target, and the parent LU number.

The volume management unit 213 acquires the LU number of the LU mapped in the target via the configuration management program 412 of the storage device 300 to which the target allocated to the user belongs. Furthermore, the volume management unit 213 requests release of LU mapping to the main and the sub target, release LU connection, and delete the initiator name, CHAP, and the password. The configuration management program 412 releases the LU mapping from the main and the sub target and releases the specified LU connection. Furthermore, the configuration management program 412 deletes the initiator name, CHAP, and the password from the target table.

The volume management unit 213 deletes the user information from the allocation management information 225 and modifies the allocation state of the target information 22 to "unallocated". Furthermore, LU information 224 is searched according to the LU number used for allocation and the allocation state is modified to "unallocated"

By the aforementioned procedure, the allocated target and LU can be used for allocation or extension of the other user.

—Volume Remaining Amount Management Process—

The volume remaining amount management process is executed by the allocation management unit 213 of the volume management program 211. The volume remaining amount is subjected to the remaining amount management by using the target remaining amount management information 226 and the LU remaining amount management information 227. FIG. 12 shows the configuration. The target remaining amount management information 226 has the following items: device ID, controller, total number of targets, allocation quantity, and threshold value. [The device ID, controller, total number of targets] represents the total number of target information 222 defined in the controller of the storage device 300. The allocation quantity represents the number allocated to the user. The threshold value is the number of target information 222 not allocated to the user, serving as a reference to issue an alarm to the administrator or stop allocation process. The value may be modified by the administrator.

The LU remaining amount management information 227 has the following items: device ID, LU size, RAID-GID, total number of LUs, allocation quantity, and threshold value. [Device ID, RAID-G size, total number of LUs] represents the total number of the LU information 224 defined in the RAID-G of the storage device 300. The threshold value represents the number of LU information 224 not allocated to the user and serves as a reference of issuing an alarm to the administrator or adding an LU. This value may be modified by the administrator.

The allocation management unit 213 is called for executing the extension process, and allocation release process upon completion of a process. The allocation management unit 213 references the target information 222 and the LU information 224 allocation state value and updates the target remaining amount management information 226 and the allocation quantity of the LU remaining amount management information 227. Next, the allocation management unit 213 calculates the unallocated quantity and compares it to each threshold value. When the number of the unallocated target information 222 has reached the threshold value of the target remaining amount management information 226, it sets the management state of the corresponding storage device information to [out of allocation object]. Thus, this storage device 211 is excluded from the allocation object. However, the extension and the allocation release process are executed. When the number of unallocated target information 222 exceeds the threshold value of the target remaining amount management information 226, the management state of the corresponding storage device information 211 is set to "allocation object". Thus, the storage device 211 can be used for the allocation process. When all the storage device information 211 have become "out of allocation object", an alarm is issued to the administrator. For this, the mail transmission function can be used. Moreover, the following process can also be performed. The storage device information 211 in the "waiting" state is set to "allocation object". Thus, as the number of users increases, the number of targets and LUs of the storage device can be dynamically increased.

When the number of unallocated LU information 224 has reached the threshold value of the LU remaining amount management information 227, an alarm is issued to the administrator. For this, the mail transmission function can be used. Moreover, the management state of the corresponding storage device information 211 is set to "out of allocation object". Thus, the storage device 211 is excluded from the allocation object. However, the extension and the allocation release process are executed. When the number of unallocated LU information 224 exceeds the threshold value of the LU remaining amount management information 227, the management state of the corresponding storage device information 211 is set to "allocation object". Thus, the storage device 211 can be used for the allocation process.

Moreover, the following process can also be performed. When the number of unallocated LU information 224 has reached the threshold value of the LU remaining amount management information 227, the RAID-G information 223 in the "waiting" state is set to "allocation object". A controller having insufficient LU is specified for the item of the in-charge controller. It is also possible that both of the controllers are in charge. Thus, as the volume use amount increases, the LU of the storage device can be dynamically increased.

—Volume Allocation Report Process—

The volume allocation report process is executed by a volume report unit 213 of the volume management program 212.

The user inputs [user ID, authentication information] and executes the LU mount program 112 installed in the PC 100. The authentication information uses CHAPID and the password. An inquiry unit 113 of the LU mount program 112 sends the user ID, the CHAPID, and the password to the volume report unit 213 of the volume management program 2112. The volume report unit 213 searches the allocation management information 225 and decides the allocation target of the corresponding user. The target information 222 is decided according to the target ID and reports the iSCSI initiator name, the main and the sub iSCSI target name, and the iSCSI target IP address to the inquiry unit 113 of the LU mount program 112. The mount control unit 114 of the LUL mount program 112 mounts the allocated volume on the OS of the PC 100 by using the reported iSCSI initiator name, the main and the sub iSCSI target name, the iSCSI target IP address, and the authentication information. The user stores a file or the like in the mounted volume for use.

The volume allocation and extension can also be performed by the user from the PC used by the user.

—Allocation Process Flow—

The user inputs [user ID, authentication information, size] and executes the LU mount program 112 installed in the PC 100. The authentication information uses the CHAPID and the password. The LU inquiry unit 113 of the LU mount program 112 sends the user ID, the CHAPID, the password, and the size to the volume report unit 212 of the volume management program 212. The volume report unit 213 searches the allocation management information 225 and decides the allocation target of the corresponding user. In the case of a new allocation, no user ID is registered and allocation is requested to the volume management unit 213. The allocation process is identical to the aforementioned embodiment. The volume management unit 213 reports allocation completion to the volume report unit 212.

—Extension Process Flow—

The user inputs [user ID, authentication information] and executes the LU mount program 112 installed in the PC 100. The LU inquiry unit 113 of the LU mount program 112 acquires the iSCSI initiator name, the main and the sub iSCSI target name, and the iSCSI target IP address from the volume report unit 212.

The mount control unit 114 of the LU mount program 112 mounts the allocated volume on the OS of the PC 100 by using the iSCSI initiator name, the main and the sub iSCSI target name, the iSCSI target IP address, and the authentication information. The mount control unit 114 checks the use capacity of the mounted volume. When a certain value such as 80% has been used, values of [user ID, authentication information] and an extension request are sent to the volume management unit 213 of the volume management program 212.

The volume management unit 213 searches the allocation management information 225 and decides the allocation target of the corresponding user. The volume management unit 213 searches the used RAID-G and the basic LU size of the LU and adds one LU. The extension process is identical to the aforementioned embodiment. The volume management unit 213 reports the extension completion to the mount control unit 114. At this stage, the PC 100 cannot recognize the volume extension. Accordingly, the mount control unit 114 unmounts the mounted volume and mounts it again. When remount is performed, the extended LU region is managed as an unused region by the OS. The mount control unit 114 can also perform file format process on the unused region.

In the aforementioned "outline of the service start preparation", the initiator is not defined in the storage device it is possible to define the combination of the target and the initiator in the storage at the stage of the start preparation. Referring to FIG. 13, the allocation process in this case will be explained.

The administrator creates a target from the management device 200 and defines a target name. Moreover, the administrator defines an initiator in the target. The administrator creates RAID-G 700, decides the LU size, and creates LU 600 in the RAID-G 700. This sets the predetermined controller number, a port number, a target name in the target number, and an initiator name in the target table 411.

Next, the administrator creates resource management information of the volume management table 220 (storage device information 221, target information 222, RAID-G information 223, LU information 224). The target information 222 in the resource management information sets the combination of the target name and the initiator name which have been set above (2002).

The administrator performs a volume allocation process. The administrator issues an allocation request to the volume management unit 213 (2003). The volume management unit 213 selects an LU and a target to be allocated according to the following rule and decides the combination of the target and the initiator to be allocated to the user (2004).

The volume management unit 213 requests the configuration management program 412 to perform LU mapping to the main and the sub target, LU connection, CHAP, and password setting via the management I/O port of the storage device 300 to which the selected target belongs. The configuration management program 412 maps the LU to the main and the sub target, connects the specified LU, and sets the CHAP and the password in the target table (2005).

The volume management unit 213 sets the user ID allocated to the allocation management information 225, the CHAP, the password, the target ID of the allocated target information 222, the parent number of the allocated LU, and the volume size (2006).

When a user uses the allocated volume, the user uses the LU mount program 112 and sends [user ID, authentication information] to the volume report unit 213 of the volume management program 212 (2007). The volume report unit 213 searches for the allocation management information 225, decides the target information 222 of the corresponding user, and reports the iSCSI initiator name, the main and the sub iSCSI target name, and iSCSI target IP address (2008). The LU mount program 112 of the PC uses the reported iSCSI initiator name, the main and the sub iSCSI target name, the iSCSI target IP address, and the authentication information so as to mount the allocated volume on the OS of the PC 100.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage allocation method for allocating a storage region to a plurality of computers in a system, the system including the plurality of computers, a plurality of storage devices, and a management device, the plurality of computers, the plurality of storage devices, and the management device being coupled by a network, wherein each of the plurality of storage devices includes a plurality of ports, the method comprising:

generating, by a storage device of the plurality of storage devices, a plurality of targets in each of the plurality of ports, and a plurality of storage regions in the storage device;

managing, by the management device, allocation information, which identifies the plurality of targets set by the storage device, initiator indicating a computer corresponding to a target of the plurality of targets, the plurality of storage regions set in the storage device, and a target allocation state indicating whether the target is allocated or unallocated to a computer of the plurality of computers;

when an allocation request including a size required for a storage region is received from the computer, selecting, by the management device, a storage device of the plurality of storage devices, the selected storage device including a plurality of unallocated storage regions that are larger than the size requested, wherein each of the plurality of ports in the selected storage device includes targets that are unallocated to the computer, and the selected storage device selects an unallocated target as a first target in a port of the selected storage device and an unallocated storage region as the storage region to be allocated to the computer;

when the number of allocated targets in the selected storage device exceeds a predetermined number, selecting, by the management device, another storage device for allocating the storage region to the computer;

correlating, by the storage device, the selected first target and the initiator indicating the computer with the selected storage region; and reporting, by the management device, the allocated first target and the initiator to the computer.

2. The storage allocation method according to claim 1, wherein the management device references the allocation information and selects a storage device having a plurality of unallocated storage regions and allocates a target, an initiator, and a storage region.

3. The storage allocation method according to claim 2, wherein among the targets of the storage device, a target using a port having a small allocation quantity is selected, and a target, an initiator, and a storage region are allocated.

4. The storage allocation method according to claim 3, wherein when the number of the allocated targets of the storage device exceeds the predetermined number, the another storage device selected by the management device has a plurality of unallocated storage regions.

5. The storage allocation method according to claim 3, wherein the management device manages storage devices having the number of allocated targets or storage regions within a certain number are managed as allocation candidates among the plurality of storage devices and when the number exceeds the certain number, the storage device is excluded from the allocation candidates.

6. The storage allocation method according to claim 5, further comprising:

when the number of storage devices excluded from the allocation candidates has reached a predetermined number, generating, by the management device, a new storage region, and managing the generated storage region as an allocation candidate.

7. The storage allocation method according to claim 1, wherein upon reception of a request for releasing the storage region allocated to a user, the management device acquires information on the target allocated to the user and the storage region from the storage device, transmits a release request for releasing the initiator name, the storage region, and the authentication information correspondence from the target according to the acquired information to the storage device, and the storage device makes the target and the storage region to be an unallocated target and a storage region according to the release request.

8. The storage allocation method according to claim 1, wherein the first target comprises a main target and a sub target, wherein the first target is in a first port of the plurality of ports of the selected storage device, and the sub target is in a second port of the plurality of ports of the selected storage device, wherein each of the plurality of storage regions includes a logical unit, and wherein when the first port fails, the second port is used for accessing the logical unit in the selected storage region.

9. The storage allocation method according to claim 1, wherein the management device includes target remaining amount management information, wherein the target remaining amount information includes, for each storage device, a corresponding identifier of the storage device, a corresponding identifier of the controller comprised in the storage device, a corresponding number indicating a total number of targets defined in the controller of the storage device, a corresponding allocation quantity representing the number allocated to a user, and a corresponding threshold value representing the number of targets not allocated to the user, and wherein the threshold value is a reference used to issue an alarm to an administrator or to stop allocation.

10. A storage system comprising:

a plurality of computers;

a plurality of storage devices; and a management device, wherein the plurality of computers, the plurality of storage devices, and the management device are coupled by a network, wherein each of the plurality of storage devices includes a plurality of ports, wherein a storage device of the plurality of storage devices generates a plurality of targets in each of the plurality of ports, and a plurality of storage regions in the storage device, wherein the management device manages allocation information, which identifies the plurality of targets set by the storage device, an initiator indicating a computer corresponding to a target of the plurality of targets, the plurality of storage regions set in the storage device, and a target allocation state indicating whether the target is allocated or unallocated to a computer of the plurality of computers, when an allocation request including a required storage region capacity is received from the computer, the management device selects a storage device of the plurality of storage devices, the selected storage device including a plurality of unallocated storage regions that are larger than the required storage region capacity requested, wherein each of the plurality of ports in the selected storage device includes targets that are unallocated to the computer, and the selected storage device selects an unallocated target as a first target in a port of the selected storage device and an unallocated storage region as the storage region to be allocated to the computer, wherein when the number of allocated targets in the selected storage device exceeds a predetermined number, the management device selects another storage device for allocating the storage region to the computer, wherein the management device includes a storage management unit for correlating the selected storage region with the selected first target and the initiator indicating the computer, wherein the storage region management unit instructs the storage device to create a plurality of combinations of an initiator, a target and storage regions, and registers a plurality of allocatable combinations of the initiator, the target and the storage regions, wherein the computer reports the allocation request containing the storage region capacity required by the computer and computer position information to the management device, and wherein the storage region management unit allocates a set of the initiator and the target and the storage region to the computer from the registered combinations of the initiator and targets and the storage regions.

11. The storage system according to claim 10,
wherein the storage management unit selects an allocatable storage device group according to the computer position information and references the allocation information to selects a storage device having a plurality of unallocated regions from the selected storage device group.

12. The storage system according to claim 10,
wherein the storage management unit references the allocation information and selects the initiator and the target from a port having a plurality of unallocated initiators and targets.

13. The storage system according to claim 12,
wherein the storage management unit reports information on the allocated combination of the initiator and the target and the storage region to the storage device, and the storage device correlates the allocated storage region to the allocated target.

14. The storage system according to claim 13,
wherein the computer reports a user ID to the management device, and the management device correlates the user ID with the allocated initiator and the target.

15. The storage system according to claim 14,
wherein the storage device further includes a storage region report unit for reporting information on an allocated storage region to a computer,
the storage region report unit reports the initiator and the target correlated with the user ID to the computer, and
the computer mounts the allocated storage region by using the reported initiator and the target.

16. The storage system according to claim 10,
wherein the first target comprises a main target and a sub target,
wherein the first target is in a first port of the plurality of ports of the selected storage device, and the sub target is in a second port of the plurality of ports of the selected storage device,
wherein each of the plurality of storage regions includes a logical unit, and
wherein when the first port fails, the second port is used for accessing the logical unit in the selected storage region.

17. The storage system according to claim 10,
wherein the management device includes target remaining amount management information,
wherein the target remaining amount information includes, for each storage device, a corresponding identifier of the storage device, a corresponding identifier of the controller comprised in the storage device, a corresponding number indicating a total number of targets defined in the controller of the storage device, a corresponding allocation quantity representing the number allocated to a user, and a corresponding threshold value representing the number of targets not allocated to the user, and
wherein the threshold value is a reference used to issue an alarm to an administrator or to stop allocation.

18. A method for allocating a storage region to computers in a storage system, the storage system including a plurality of computers, a plurality of storage devices, and a management device, the plurality of computers, the plurality of storage devices, and the management device being coupled by a network device, wherein each of the plurality of storage devices includes a plurality of ports, the method comprising steps of:

generating a plurality of targets in each of the plurality of ports, and generating a plurality of storage regions in the storage device;

managing, by the management device, allocation information, which identifies the plurality of targets sets in the storage device, initiator indicating a computer corresponding to a target of the plurality of targets, the plurality of storage regions set in the storage device, and a target allocation state indicating whether the target is allocated or unallocated to a computer of the plurality of computers;

upon reception of a required storage region size and user information from the computer, selecting, by the management device, a storage device of the plurality of storage devices, the selected storage device including a plurality of unallocated storage regions that are larger than the required storage region size, wherein each of the plurality of ports in the selected storage device includes targets that are unallocated to the computer, and the selected storage device selects an unallocated target as a first target in a port of the selected storage device and an unallocated storage region as the storage region to be allocated to the computer;

when the number of allocated targets in the selected storage device exceeds a predetermined number, selecting, by the management device, another storage device for allocating the storage region to the computer;

correlating, by the storage device, the selected first target and the initiator indicating the computer with the selected storage region; and reporting, by the management device, the allocated first target and the initiator to the computer.

19. The method according to claim 18,
wherein the first target comprises a main target and a sub target,
wherein the first target is in a first port of the plurality of ports of the selected storage device, and the sub target is in a second port of the plurality of ports of the selected storage device,
wherein each of the plurality of storage regions includes a logical unit, and
wherein when the first port fails, the second port is used for accessing the logical unit in the selected storage region.

20. The method according to claim 18,
wherein the management device includes target remaining amount management information,
wherein the target remaining amount information includes, for each storage device, a corresponding identifier of the storage device, a corresponding identifier of the controller comprised in the storage device, a corresponding number indicating a total number of targets defined in the controller of the storage device, a corresponding allocation quantity representing the number allocated to a user, and a corresponding threshold value representing the number of targets not allocated to the user, and
wherein the threshold value is a reference used to issue an alarm to an administrator or to stop allocation.

* * * * *